United States Patent
Crowl et al.

(10) Patent No.: US 7,080,370 B1
(45) Date of Patent: Jul. 18, 2006

(54) METHOD AND APPARATUS FOR COMPILING SOURCE PROGRAMS USING ONE OR MORE LIBRARIES

(75) Inventors: Lawrence A. Crowl, Mountain View, CA (US); Michael S. Ball, La Mesa, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 662 days.

(21) Appl. No.: 09/693,517

(22) Filed: Oct. 19, 2000

Related U.S. Application Data (60) Provisional application No. 60/193,527, filed on Mar. 31, 2000, provisional application No. 60/163,891, filed on Nov. 5, 1999.

(51) Int. Cl.
  *G06F 9/44* (2006.01)
(52) U.S. Cl. ...................................................... 717/163
(58) Field of Classification Search ........ 717/140–154, 717/162–166, 116, 136, 100, 122; 709/331–332, 709/316; 714/35
  See application file for complete search history.

(56) References Cited

U.S. PATENT DOCUMENTS

| | | | | |
|---|---|---|---|---|
| 5,291,601 A | * | 3/1994 | Sands ........................... | 709/331 |
| 5,408,665 A | * | 4/1995 | Fitzgerald .................... | 717/163 |
| 5,574,898 A | * | 11/1996 | Leblang et al. ................ | 707/1 |
| 5,615,400 A | * | 3/1997 | Cowsar ....................... | 709/332 |
| 5,642,514 A | * | 6/1997 | Peckham ..................... | 717/144 |
| 5,848,274 A | * | 12/1998 | Hamby et al. ............... | 717/153 |
| 6,041,180 A | * | 3/2000 | Perks et al. .................. | 717/151 |
| 6,226,786 B1 | * | 5/2001 | Hickman et al. ........... | 717/124 |
| 6,308,320 B1 | * | 10/2001 | Burch ......................... | 717/154 |
| 6,405,368 B1 | * | 6/2002 | Freyburger .................. | 717/140 |
| 6,438,743 B1 | * | 8/2002 | Boehm et al. .............. | 717/122 |

* cited by examiner

*Primary Examiner*—Kakali Chaki
*Assistant Examiner*—Tuan Anh Vu
(74) *Attorney, Agent, or Firm*—Beyer Weaver & Thomas, LLP (57) ABSTRACT

Improved techniques for reducing the time and cost associated with producing compiler products are disclosed. A programming system including an enhanced compiler suitable for compilation of source programs is disclosed. The enhanced compiler can be used to compile source programs so that template (or generic) instances already available from the libraries are not recreated. The enhanced compiler can efficiently compile a request to create an instance by determining whether the instance is already available in one of the libraries. If the instance is already available from one of the libraries, the instance need not be created. In comparison with conventional models, the enhanced compiler can access libraries directly without requiring a significant amount of preparatory work and/or costly operations such as preparation of options files and transformation of instance names to linker symbol names. As a result, the enhanced compiler is more efficient (faster) than convention compilers.

16 Claims, 5 Drawing Sheets

METHOD AND APPARATUS FOR COMPILING SOURCE PROGRAMS USING ONE OR MORE LIBRARIES

CROSS-REFERENCE TO RELATED APPLICATIONS

This application claims the priority benefit of U.S. Provisional Application No. 60/163,891, filed Nov. 5, 1999, and entitled "AVOIDING REPEATED INSTANTIATION OF TEMPLATE INSTANCES IN LIBRARIES", the content of which is hereby incorporated by reference. This application also claims the priority benefit of U.S. Provisional Application No. 60/193,537, filed Mar. 31, 2000, and entitled "METHOD AND APPARATUS FOR COMPILING SOURCE CODE PROGRAMS HAVING ONE OR MORE ASSOCIATED LIBRARIES", the content of which is hereby incorporated by reference. This application is also related to application Ser. No. 09/649,270, filed Aug. 28, 2000, and entitled "METHOD AND APPARATUS FOR PRODUCING COMPRESSED COMPILER PRODUCTS" which is also incorporated herein by reference for all purposes.

BACKGROUND OF THE INVENTION

1. Field of the Invention

The present invention relates to compilers and, more particularly, to improved methods for compiling source programs using one or more libraries.

2. Description of the Related Art

A computer program is typically written in a high-level programming language, such as Fortran, C, C++, Java, Ada, etc. Computer programs written in high-level programming languages can be referred to as source programs. Typically, source programs are composed of one or more source files. A compiler translates at least a portion of one or more source files into one or more object files. An individual translation of a source file which is translated by the compiler can be referred to as a compilation unit. A linker can combine one or more object files into an executable program. A computer can then interpret (run) the executable program. The combination of the compiler, linker, and computer can be referred to as a "programming system".

Object files are typically packaged together into libraries, which also can be provided to the linker. Because the libraries are often provided by different institutions, the compilation environment of the libraries is often different from that of the other objects within the program.

Modern programming languages often provide a mechanism for the programmer to write portions of the source which can be replicated and specialized for a number of different uses. For example, such mechanism is called "generics" in Ada and "templates" in C++. To illustrate, a programmer may define, for example, a generic "stack" data structure template with several available operations, such as push, pop, list, etc. The programmer or the compiler can later specialize the stack to be a stack of integers, a stack of stacks of floating-point numbers, etc.

When a programming language permits specialization of generic templates, the compiler must generate the specialization. In C++ programming language, this process is called instantiation, and the specialized templates are called instances. Because only one instance is typically required to produce the executable program, a programming system should produce only one "effective" instance for any one program. A programming system can produce only one effective instance, by either preventing duplicate instantiations or rendering any duplicates inoperative. Thus, producing only one "effective" instance.

One method for producing only one effective instance can be referred to as "link-time translation". Link-time translation operates to compile without producing any instances. Using this method, the linker will initially fail to produce the executable program because some instances are missing and remain unresolved at initial link time. A programming system using link-time translation, however, can extract the names of missing instances after the initial link and compile the missing instances, and re-link to produce the executable program. One drawback with the link-time translation is that it leads to very long link times. Further, it separates the cause of an error (the use of an instance in a compilation unit) from the reporting of an error (provided by the compilation of the instance), which may make locating and correcting errors difficult.

Another method for producing only one effective instance can be referred to as "assigning instances to translation units". Using this method, it is possible to track requests for instances and instances missing at link time. When a source unit is subsequently recompiled, the instances assigned to it can be generated to produce the executable program. However, similar to the link-time translation method, this method can lead to very long link times, as well as typically requiring recompilation of source units.

Still another method for producing one effective instance is to generate all instances needed for every compilation unit, and then rely on the linker to either bypass or remove duplicate instances. The bypassing of instances can be achieved with several techniques, including "archive search order", "weak symbols", "common data (comdat)", and "dynamic link interposition". One drawback with this method is that it typically leads to unnecessarily large object files because instances generally appear in the objects more than once. It can also lead to long compilation times since object files are larger than necessary, as well as long link times because the linker has to process unused instances.

Finally, another method is to generate the instances into a repository that is shared between compilation units. The compiler generates an instance within a secondary object file and places the secondary object into the repository, but only if the instance does not already exist within the repository. This method can also result in unnecessarily large object files, as well as requiring larger compilation times than the other methods because of the need for a repository and the increased number of object files. Furthermore, using a shared repository requires having a shared compilation environment. However, libraries are not typically compiled in the same compilation environment. Thus, duplicate instances may often still exist between libraries and non-library objects, although, it is possible to bypass or remove duplicate instances within libraries. Rather than bypass or remove duplicates from libraries, it would be more efficient to not generate duplicates of instances within the libraries.

To prevent unnecessary duplication, compilers may provide a mechanism for the programmer to specify a list of instances that are to be suppressed (not to be generated). For example, in the Sun C++ compilers, this mechanism takes the form of "directives" within an "options file". This mechanism may be used to avoid duplicating instances within libraries by extracting the linker symbol names (linker names) from the libraries, filtering those names to remove non-instance names, to yield a list of instance names. The list of instance names can be converted to a suppression list which can be provided to the compiler during compilation of a compilation unit. The compiler can then convert the names on the suppression list to an internal representation so that the compiler can compare the internal representation of candidate instances to the names in the suppression list before generating instances.

Unfortunately, however, generating this list requires significant amount of time, resources and preparatory work. In addition, constructing the suppression list requires converting linker symbol names to the program's symbol names (e.g., C++ symbol names). This conversion can be difficult, fragile or even untenable, because languages may require more information in the linker symbol name than is present in the language name, which may be difficult to remove, or because they may require less information in the linker symbol name than is present in the language name, which may be impossible to recover. Furthermore, the comparing of the internal representations within the compiler can itself be a difficult and fragile task.

In view of the foregoing, there is a need for more efficient methods of compiling source programs making use of instances and libraries.

SUMMARY OF THE INVENTION

Broadly speaking, the invention relates to improved techniques for reducing the time and cost associated with producing compiler products. One aspect of the invention pertains to a programming system including an enhanced compiler suitable for compilation of source programs such that instances already created and available from libraries are not recreated. An enhanced compiler, according to the invention can efficiently compile a request to create an instance by determining whether the instance is already available in one of the libraries. If the instance is already available from one of the libraries, the instance need not be created. In comparison with conventional models, the enhanced compiler can access libraries directly, without requiring a significant amount of preparatory work and/or costly operations, such as preparation of options files and transformation of instance names to linker symbol names. As a result, the enhanced compiler is more efficient (faster) than conventional compilers.

The invention can be implemented in numerous ways, including as a method, compiling system, and computer readable media. Several embodiments of the invention are discussed below.

As a method for compilation of source program using one or more associated libraries, an embodiment of the invention includes the acts of: identifying one or more instances available for use in the one or more libraries; receiving a first request to create a first instance during compilation of the source program; determining whether the first instance has been identified in the one or more libraries; and creating the first instance when the first instance has not been identified in the one or more libraries and not when the first instance has been identified in the one or more libraries.

As a compiler system suitable for compilation of source programs, an embodiment of the invention includes: a source program; a library including at least one instance available for use by the source program; and an enhanced compiler suitable for compilation of source code, wherein the enhanced compiler accesses the library to identify the one instance available in the library.

As a method for compilation of source programs having one or more associated libraries with instances available for use by the source program, another embodiment of the invention comprises the acts of: examining a linker name table of the one or more associated libraries; extracting from the linker name table one or more linker symbol names that are likely to correspond to instances; storing the one or more linker symbol names that have been extracted as one or more stored linker symbol names; receiving a first request to create a first instance during compilation of the source program, the first instance having a first linker symbol name; comparing the first linker symbol name with the one or more stored linker symbol names; and creating the first instance only when the comparing indicates that the first linker symbol name is not one of the stored linker symbol names.

As a computer readable media including computer program code for compilation of source program using one or more associated libraries, an embodiment of the invention includes: computer program code for identifying one or more instances available for use in the one or more libraries; computer program code for receiving a first request to create a first instance during compilation of the source program; computer program code for determining whether the first instance is available for use in the one or more libraries; and computer program code for creating the first instance when the first instance has not been identified in the one or more libraries and not creating the first instance when the first instance has been identified in the one or more libraries.

The invention has numerous advantages. Different embodiments of the invention can have one or more of the following advantages. One advantage of the invention is that the amount of preparatory work required to produce compiler related products is significantly reduced as compared to conventional approaches. Another advantage of the invention is the compiling and linking times associated with compilations by compilers can be substantially improved. Yet another advantage of the invention is that cost effective and not overly complicated implementations are possible.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention pertains to improved techniques for reducing the time and cost associated with producing compiler products. One aspect of the invention pertains to a programming system including an enhanced compiler suitable for compilation of source programs such that instances already created and available from the libraries are not recreated. An enhanced compiler, according to the invention, can efficiently compile a request to create an instance by determining whether the instance is already available in one of the libraries. If the instance is already available from one of the libraries, the instance need not be created. In comparison with conventional models, the enhanced compiler can access libraries directly, without requiring a significant amount of preparatory work and/or costly operations, such as preparation of options files and transformation of instance names to linker symbol names. As a result, the enhanced compiler is more efficient (faster) than convention compilers.

Figure 1:
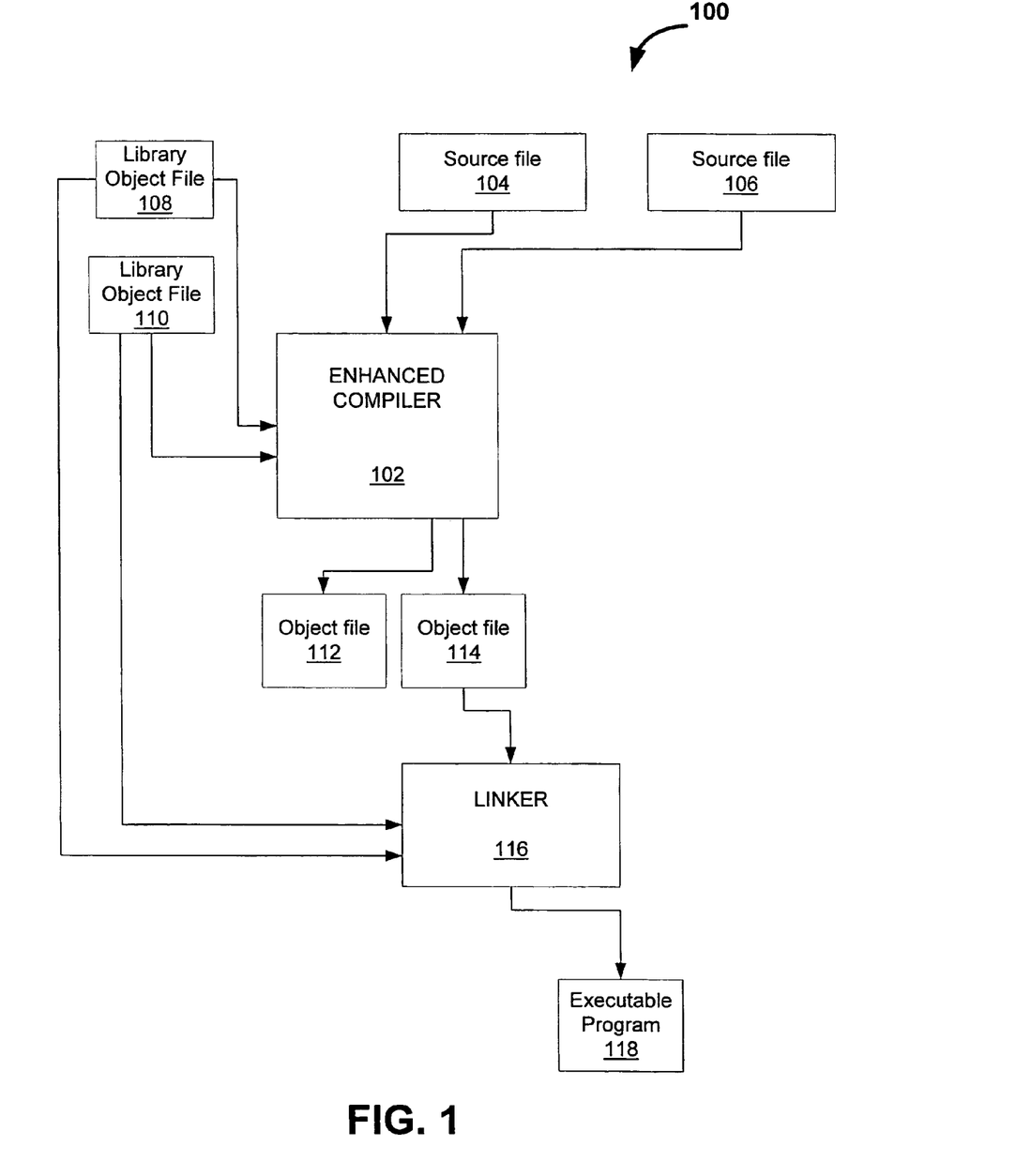
FIG. 1 illustrates an exemplary programming system according to one embodiment of the invention.

FIG. 1 illustrates an exemplary programming system 100 in accordance with one embodiment of the invention. The exemplary programming system 100 includes an enhanced compiler 102 suitable for compilation of source files to produce object files. More particularly, the enhanced compiler 102 can receive one or more source files, for example, source files 104 and 106. The enhanced compiler 102 also accesses one or more library object files, for example, object files 108 and 110.

Unlike the conventional models, the enhanced compiler 102 can access the library object files 108 and 110 directly, without requiring a significant amount of preparatory work, e.g., preparation of options files. Furthermore, the enhanced compiler 102 can determine whether the desired instance object is available in library object files 108 or 110 through use of linker symbol names (linker names). Hence, unlike the conventional approaches, it is no longer necessary to transform between linker symbol names and programming language symbol names in order to determine whether an instance already exists in a library object file.

Accordingly, the enhanced compiler 102 operates to compile source files 104 and 106 while determining whether a desired instance object is available in library object files 108 or 110. If the instance object is already available, it need not be created. As a result, one or more object files, for example, object files 112 and 114 can be efficiently generated by the enhanced compiler 102. Furthermore, unlike conventional models, two or more object files, for example, 112 and 114 can then be linked together (with library object files 108 and 110) by a linker 116 to produce the executable program 118 without requiring relatively long link times. The executable program 118 is in object code and represents the output of the exemplary programming system 100. In addition, according to the invention as explained in more detail below, the executable program 118 can be produced without requiring several passes to be made through the enhanced compiler 102 and/or the linker 116.

Figure 2:
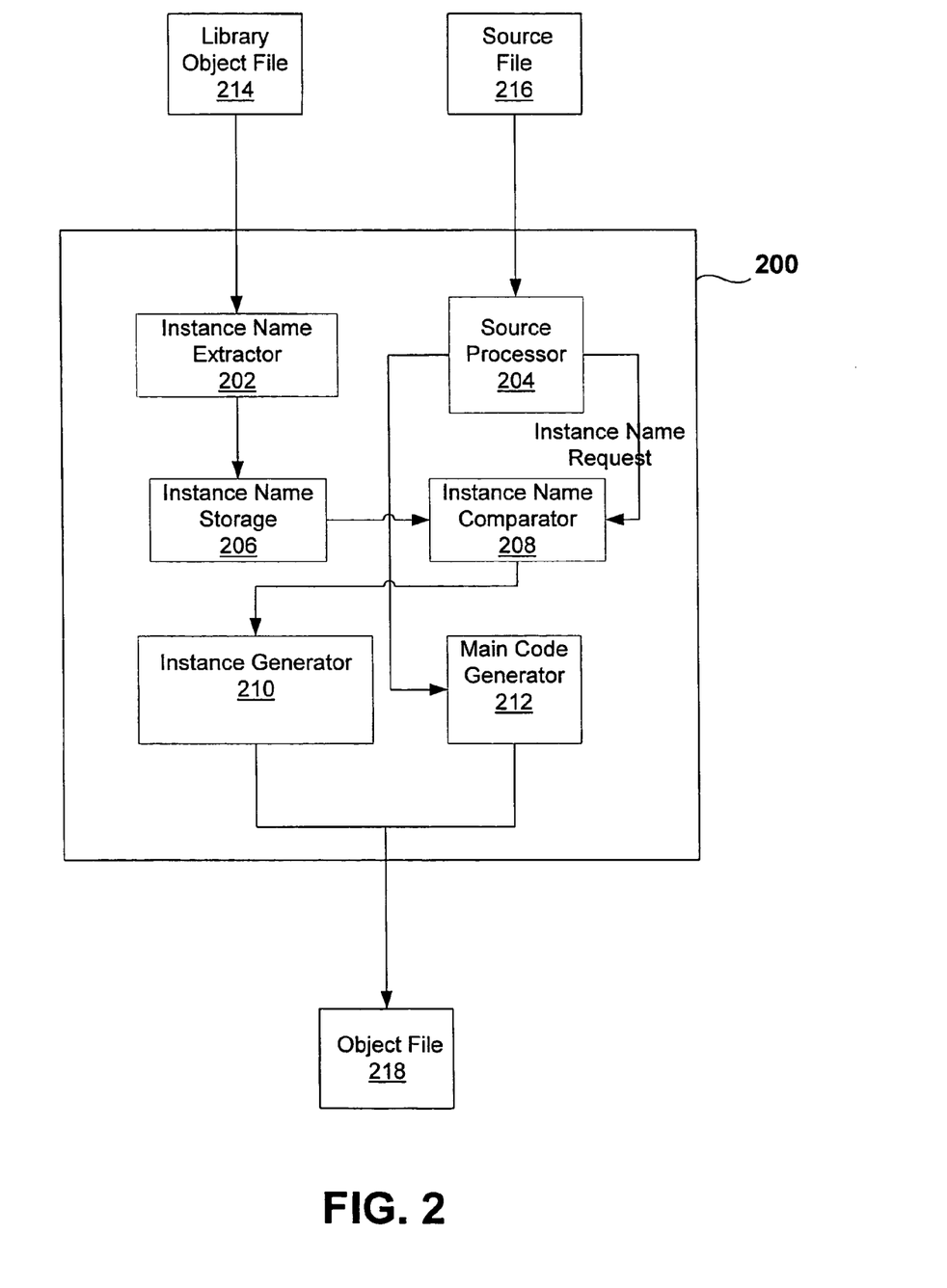
FIG. 2 illustrates an exemplary enhanced compiler in accordance with another embodiment of the present invention.

FIG. 2 illustrates an exemplary enhanced compiler 200 in accordance with another embodiment of the present invention. The enhanced compiler 200 represents, for example, a more detailed embodiment of the enhanced compiler 102 of FIG. 1. As shown in FIG. 2, the enhanced compiler 200 includes an instance name extractor 202, a source processor 204, an instance name storage 206, an instance name comparator 208, an instance generator 210, and a main code generator 212. The instance name extractor 202 can access one or more library object files, for example, a library object file 214. The library object file 214 library can include instances that are available for use. In one embodiment, the instance name extractor 202 accesses the object file 214, to extract instance names that may be available and stores these instance names in the instance name storage 206. It should be noted that a source processor 204 can also be utilized for source processing of one or more source files, such as a source file 216.

In one embodiment, the instance extractor 202 identifies all the linker names in the library object file(s) that correspond to instances. In one particular embodiment, all the linker names having a sequence of characters that may correspond to an instance name are extracted and then stored. For example, one such sequence of characters for C++ linker names that may correspond to an instance can be "__1*4*" where "*" represents one or more characters that could be any characters ("wild characters"). As will be appreciated by those skilled in the art, a wide variety of methods and data structures can be used to facilitate access to a storage device. For example, a hash table can be utilized to arrange the information in the instance name storage 206. In this way, the enhanced compiler 200 can access one or more library object files to identify instance names.

During a compilation of the source file 216, the enhanced compiler 200 generates an instance name request. The instance name comparator 208 can be utilized to determine whether the instance (object) corresponding to the instance name request is available in the instance name storage 206. If the desired instance is found in the instance name storage 206, the instance name need not be generated since it is already available. Accordingly, the instance generator 210 and/or main code generator 212 may be utilized to generate one or more object files, such as an object file 218.

Figure 3:
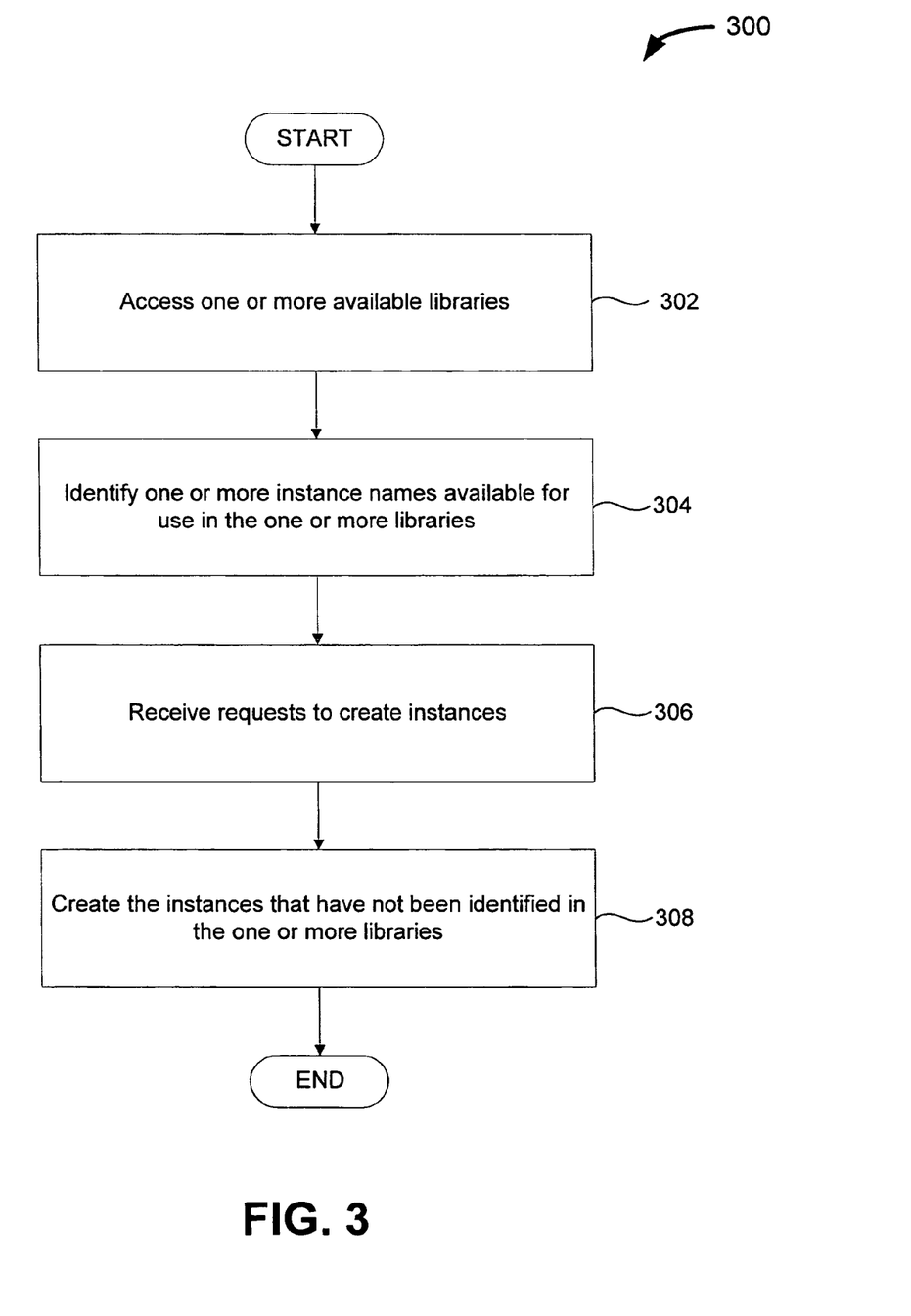
FIG. 3 illustrates a compilation method for compilation of source programs using one or more associated libraries in accordance with one embodiment of the present invention.

FIG. 3 illustrates a compilation method 300 for compilation of source programs using one or more libraries in accordance with one embodiment of the present invention. For example, the compilation method 300 can be utilized by the enhanced compiler 102 of FIG. 1 or the enhanced compiler 200 of FIG. 2. The source program to be compiled by the compilation method 300 can include one or more unit source files, such as the source files 104 and 106 of FIG. 1 or source file 216 of FIG. 2.

The compilation method 300 is initiated at operation 302, where one or more available libraries are accessed. For example, the one or more libraries can be library object files 108 or 110 of FIG. 1 or library object files 214 of FIG. 2. Next, at operation 304, one or more instance names available for use in the one or more libraries are identified. At operation 306, requests to create instances corresponding to instance names are received. The requests to create instances are typically received when the compiler is compiling a source file. Finally, at operation 308, the instances are created if the instances have not been identified as being within the one or more libraries. It should be noted that if an instance has been identified as being within the one or more available libraries, the instance can be obtained and provided from the appropriate library without having to create the instance.

Figure 4:
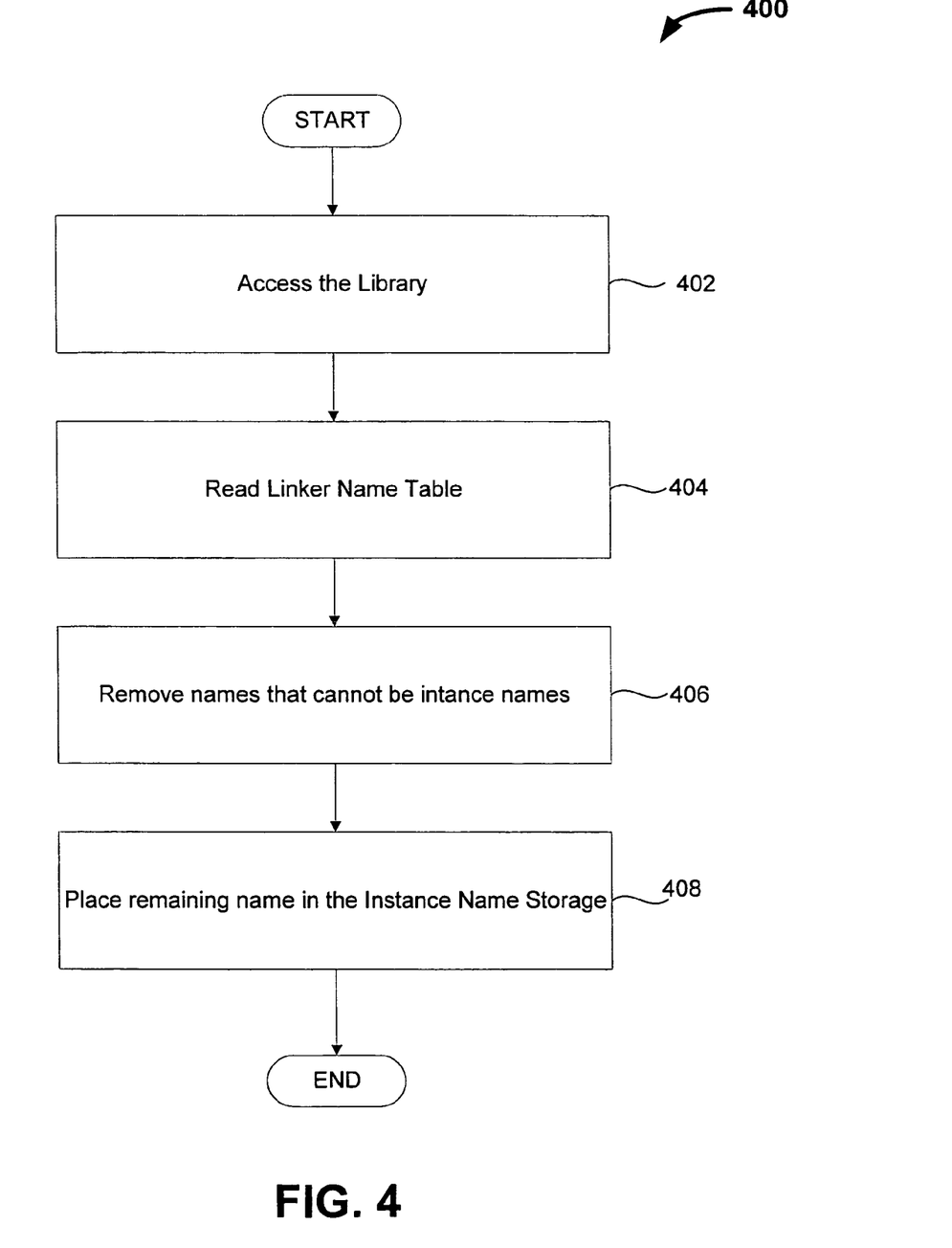
FIG. 4 illustrates a selection method for identifying instances available for use in a library in accordance with one embodiment of the present invention.

FIG. 4 illustrates a selection method 400 for identifying instance names available for use in a library in accordance with one embodiment of the present invention. The selection method 400 represents processing performed by the operation 304 in identifying one or more instance names available for use in the one or more available libraries. In one embodiment, the selection method 400 is implemented by a compiler such as the enhanced compiler 200 of FIG. 2 or the enhanced compiler 102 of FIG. 1.

Initially, at operation 402, the library is accessed. Next, at operation 404, one or more linker names in a linker table associated with the library are read. Among other things, a link table can include linker names for instances that are available in the library. At operation 406, the linker names that cannot possibly correspond to instance names are identified. Finally, at operation 408, the remaining linker names (linker names not identified at operation 406) can be stored. The remaining linker names are those linker names that can potentially correspond to instance names. These remaining linker names can be stored, for example, into an instance name storage, such as the instance name storage 206 of FIG. 2.

Figure 5:
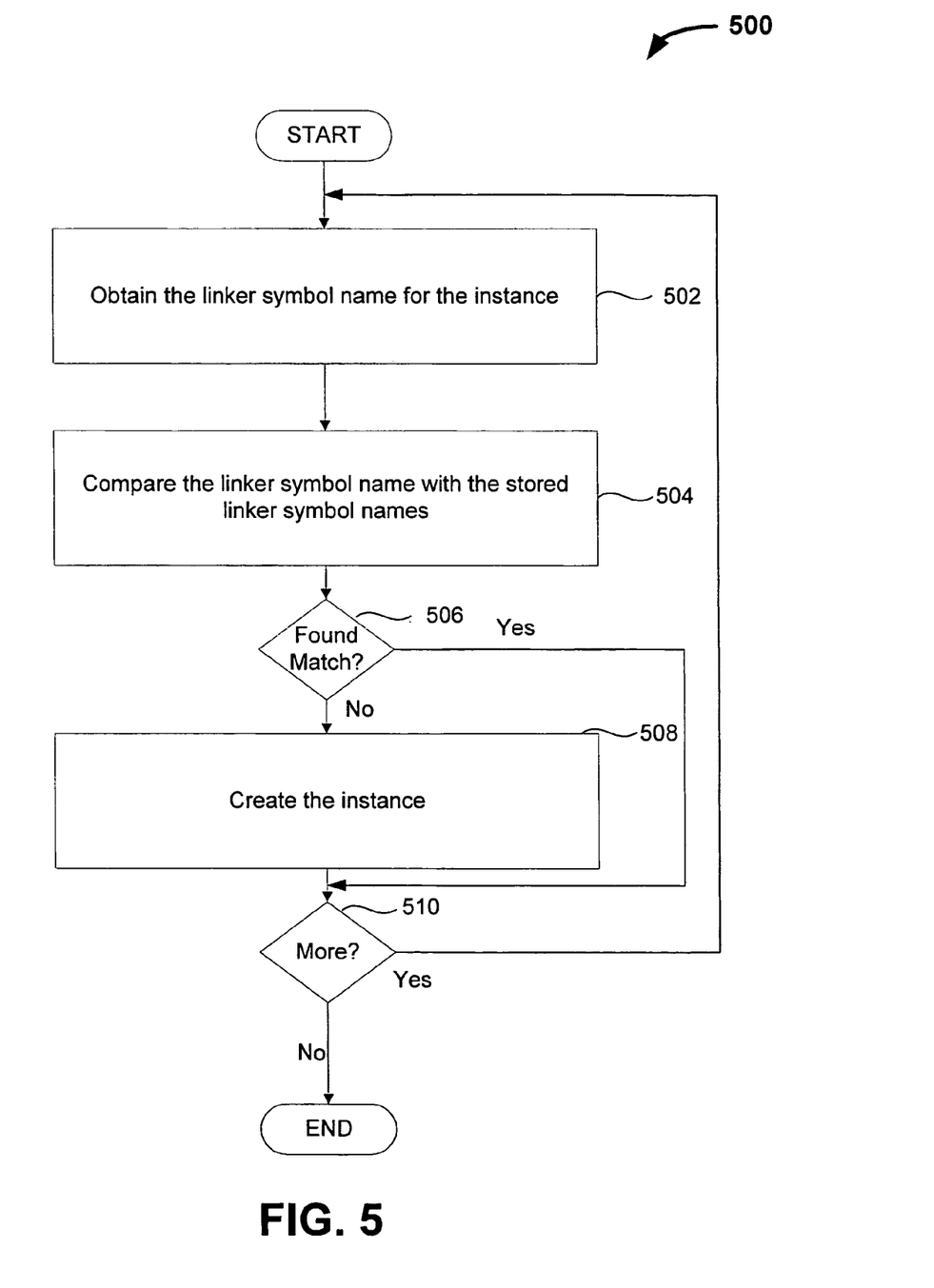
FIG. 5 illustrates a compilation method for compiling requests to create an instance in accordance with one embodiment of the present invention.

FIG. 5 illustrates a compilation method 500 for compiling requests to create an instance in accordance with one embodiment of the present invention. The compilation method 500 represents processing performed by operation 308 of FIG. 3 in processing a request for an instance. The compilation method 500 can be performed by an enhanced compiler such as the enhanced compiler 202 of FIG. 2 or the enhanced compiler 102 of FIG. 1.

The compilation method 500 starts after the compiler receives a request to create an instance. After the request for an instance is received, the linker name for the instance is obtained at operation 502. Next, at operation 504, the linker symbol name for the instance is compared with those linker symbol names available in the library. Here, as noted in FIG. 4, the linker symbol names available in the library can be stored such as in an instance name storage. Thus, the comparison can operate to compare the linker name for the instance to be created to the previously stored linker symbol names. Next, at operation 506, a determination is made as to whether there is a match for the linker name for the instance. If it is determined at operation 506 that the linker name for the requested instance does not match any of the previously stored linker symbol names, then the instance requested is created at operation 508. On the other hand, if it is determined at operation 506 that the linker symbol name for the instance requested does match one of the previously stored linker symbol names, then the operation 508 is bypassed because the instance requested is available from the library and thus need not be created. In any case, directly following the determination at operation 506 or when operation 508 is bypassed after the operation 508, the method 500 proceeds to operation 510 where a determination is made as to whether there are more requests for instances. If it is determined at operation 510 that there are more requests for instances to be processed, the compilation method 500 proceeds to operation 502 where another request for an instance can be received. On the other hand, if there are no remaining requests to create an instance, the compilation method 500 terminates.

The invention has numerous advantages. Different embodiments of the invention can have one or more of the following advantages. One advantage of the invention is that the amount of preparatory work required to produce compiler products is significantly reduced as compared to conventional approaches. Another advantage of the invention is the compiling and linking times associated with compilations by compilers can be substantially improved. Yet another advantage of the invention is that cost effective and not overly complicated implementations are possible.

Although only a few embodiments of the present invention have been described, it should be understood that the present invention may be embodied in many other specific forms without departing from the spirit or scope of the invention. By way of example, although method 300 has been set forth in terms of a particular sequential order for the purposes of this explanation, it should be apparent that in many cases the ordering is not critical. Some operations may be combined and others may be parsed into multiple operations. For example, operation 304 can be implemented as a series of multiple operations. The same functionality can also be obtained using different operations as well.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method of compilation of a source program written in one of the C++ and Ada programming languages into an object file, using one or more associated libraries of instances, wherein each instance is a specialization of a generic template and its available operations and is identified by a linker symbol name, and wherein the generic template is expressed in the same programming language as the source program, the method comprising, during compilation of the source program:

examining linker symbol names in linker tables and instance names made available in the one or more libraries;

selecting linker symbol names that are likely to correspond to instances available for use in the one or more libraries;

saving the selected linker symbol names in an instance name storage;

receiving a request to create an instance;

examining the instance name storage to determine whether the instance has been identified in the one or more libraries;

when the instance has not been identified in the one or more libraries, creating the instance, and when the instance has been identified in the one or more libraries, using the linker symbol name of the instance as a reference to the first instance already contained within the one or more libraries; and using either the newly created instance or the identified instance already contained within the one or more libraries to create the object file.

2. A method as recited in claim 1, wherein the creating of the first instance operates to create the first instance when the linker symbol name for the first instance does not match any of the identified linker symbol names for instances available for use in one or more libraries.

3. A method as recited in claim 1, wherein the examining of symbol tables is done to extract all linker symbol names that are likely to correspond to instances.

4. A method as recited in claim 1, wherein the selecting of the linker symbol names that are likely to correspond to instances is done by selecting linker symbol names that include a predetermined sequence of characters.

5. A method as recited in claim 1, wherein the saving of the selected linker symbol names is done by using a hash table.

6. A method as recited in claim 1, wherein determining whether the first instance has been identified in the one or more libraries further comprises:

obtaining a linker symbol name for the instance;

comparing the linker symbol name with those selected linker symbol names in the instance name storage that are likely to correspond to template instances, and wherein creating the instance operates to create the instance when the linker symbol does not match any of those selected linker symbol names that are likely to correspond to template instances.

7. A compiler system, embodied in a computer readable medium, the compiler system being operable to compile source programs written in one of the C++ and Ada programming languages into object files, the compiler system comprising:
- a source program;
- a library including at least one instance available for use by the source program, the at least one instance being a specialization of a generic template and its available operations and being identifiable by a linker symbol name, the generic template being expressed in the same programming language as the source program; and
- an enhanced compiler operable to compile source code into object files, wherein the enhanced compiler is operable to:
- access the library to identify the at least one instance available in the library by the linker symbol name of the at least one instance in a linker table and instance names made available in the library,
- use the linker symbol name of the instance as a reference to the instance already contained in the library, and
- use the identified instance within the library in creating the object files.

8. A compiler system as recited in claim 7, wherein the enhanced compiler further comprises:
- an instance name extractor for extracting from the library the at least one instance available for use by the source program.

9. A compiler system as recited in claim 8, wherein the enhanced compiler further comprises:
- an instance name comparator operating to compare the at least one instance available with a desired instance.

10. A compiler system as recited in claim 9, wherein the enhanced compiler further comprises:
- an instance name storage operable to store the at least one instant available for use by the source program.

11. A method of compilation of a source program written in one of the C++ and Ada programming languages into an object file, using one or more associated libraries of instances, wherein each instance is a specialization of a generic template and its available operations and is identified by a linker symbol name, and wherein the generic template is expressed in the same programming language as the source program, the method comprising during compilation of the source program:
- examining a linker table and instance names made available in the one or more associated libraries;
- extracting from the linker name table one or more linker symbol names that are likely to correspond to instances;
- storing the one or more linker symbol names that have been extracted as one or more stored linker symbol names;
- receiving a request to create an instance, said instance having a linker symbol name;
- comparing the linker symbol name with the one or more stored linker symbol names;
- creating the instance only when said comparing indicates that the linker symbol name is not one of the stored linker symbol names; and
- using the stored linker symbol name corresponding to the linker symbol name in creating the object file when said comparing indicates that the linker symbol name is one of the stored linker symbol names.

12. A method as recited in claim 11, wherein the comparing of the first linker symbol name with the one or more stored linker symbol names is done without transforming the linker symbol names of the one or more libraries.

13. A method as recited in claim 11, wherein storing at least one linker symbol is done by using a hash table.

14. A computer readable medium including computer program code for compilation of a source program written in one of the C++ and Ada programming languages into an object file, using one or more libraries of instances, wherein each instance is a specialization of a generic template and its available operations and is identified by a linker symbol name, and wherein the generic template is expressed in the same programming language as the source program, the computer readable medium comprising instructions operable to execute during compilation of the source program to:
- examine linker symbol names in linker tables and instance names made available in the one or more libraries;
- select linker symbol names that are likely to correspond to instances available for use in the one or more libraries;
- save the selected linker symbol names in an instance name storage;
- receive a request to create an instance;
- examine the instance name storage to determine whether the first instance is available for use in the one or more libraries;
- when the instance has not been identified in the one or more libraries, create the instance, and
- when the instance has been identified in the one or more libraries, use the linker symbol name of the instance as a reference to the instance already contained within the one or more libraries; and
- use either the newly created instance or the identified instance already contained within the one or more libraries to create the object file.

15. A computer readable medium as recited in claim 14, wherein the computer program code for creating the instance includes instructions operable to create the instance when the linker symbol name for the first instance does not match any of the identified linker symbol names for instances available for use in the one or more libraries.

16. A computer readable medium as recited in claim 14, wherein the instructions operable to select the linker symbol names that are likely to correspond to instances include instructions to select linker symbol names that include a predetermined sequence of characters.

* * * * *

UNITED STATES PATENT AND TRADEMARK OFFICE
CERTIFICATE OF CORRECTION

| | |
|---|---|
| PATENT NO. | : 7,080,370 B1 |
| APPLICATION NO. | : 09/693517 |
| DATED | : July 18, 2006 |
| INVENTOR(S) | : Crowl et al. |

Page 1 of 1

It is certified that error appears in the above-identified patent and that said Letters Patent is hereby corrected as shown below:

In line 3 of claim 1 (column 8, line 15) delete "associated".

In line 26 of claim 1 (column 8, line 39) delete "first".

In line 5 of claim 2 (column 8, line 48) add --the-- after "in".

In line 2 of claim 6 (column 8, line 60) delete "first".

Signed and Sealed this

Twenty-eighth Day of November, 2006

JON W. DUDAS
*Director of the United States Patent and Trademark Office*